(12) United States Patent
Loubet Moundi et al.

(10) Patent No.: US 10,509,433 B2
(45) Date of Patent: Dec. 17, 2019

(54) RANDOM CLOCK GENERATION

(71) Applicant: Gemalto SA, Meudon (FR)

(72) Inventors: Philippe Loubet Moundi, Meudon (FR); Jean-Roch Coulon, Meudon (FR); Jorge Ernesto Perez Chamorro, Meudon (FR)

(73) Assignee: Thales Dis France SA, Meudon (FR)

( * ) Notice: Subject to any disclaimer, the term of this patent is extended or adjusted under 35 U.S.C. 154(b) by 97 days.

(21) Appl. No.: 15/762,894

(22) PCT Filed: Sep. 23, 2016

(86) PCT No.: PCT/EP2016/072747
§ 371 (c)(1),
(2) Date: Mar. 23, 2018

(87) PCT Pub. No.: WO2017/050999
PCT Pub. Date: Mar. 30, 2017

(65) Prior Publication Data
US 2018/0292857 A1    Oct. 11, 2018

(30) Foreign Application Priority Data

Sep. 25, 2015   (EP) .................................... 15306497

(51) Int. Cl.
*G06F 1/06* (2006.01)
*G06F 7/58* (2006.01)
(Continued)

(52) U.S. Cl.
CPC .................. *G06F 1/06* (2013.01); *G06F 1/08* (2013.01); *G06F 7/588* (2013.01); *G06F 21/725* (2013.01); *H03K 3/84* (2013.01)

(58) Field of Classification Search
CPC ..... G06F 1/12; G06F 1/14; G06F 1/10; G06F 5/06; G06F 13/1689; G06F 1/08;
(Continued)

(56) References Cited

U.S. PATENT DOCUMENTS 5,404,402 A    4/1995  Sprunk
5,416,434 A *  5/1995  Kootstra .................. H03K 3/72
                                                    327/113
(Continued)

OTHER PUBLICATIONS

Oliver Kömmerling Advanced Digital Security Research: "Design Principles for Tamper-Resistant Smartcard Processors", USENIX, Apr. 14, 1999, pp. 1-13, XP061012603, section 3.1.
(Continued)

*Primary Examiner* — Zahid Choudhury
(74) *Attorney, Agent, or Firm* — The Jansson Firm; Pehr B. Jansson

(57) ABSTRACT

The invention relates to a random clock generator comprising an input receiving a master clock signal MClk, and a clock signal reduction circuit (101) receiving the master clock signal MClk and a whole number N and supplying an output signal corresponding to a train of N pulses every M clock pulse, M being a whole number higher than 1 and N being a whole number higher than 1 and lower than or equal to M. A number generator (102) and (103) supplies a new number (N) to the clock signal reduction circuit every P pulse of a master clock signal, N and/or P being produced randomly.

8 Claims, 3 Drawing Sheets

(51) Int. Cl.
 *H03K 3/84* (2006.01)
 *G06F 1/08* (2006.01)
 *G06F 21/72* (2013.01)

(58) Field of Classification Search
 CPC ........ G06F 1/04; G06F 1/3202; G06F 9/4825; G06F 11/0757; G06F 11/3419; G11C 7/22
 See application file for complete search history.

(56) References Cited

U.S. PATENT DOCUMENTS

| | | | | |
|---|---|---|---|---|
| 5,812,835 A * | 9/1998 | Ruuskanen | ............... | G06F 1/10 713/502 |
| 5,944,833 A * | 8/1999 | Ugon | ........................ | G06F 1/04 713/400 |
| 5,994,917 A * | 11/1999 | Wuidart | .................... | G06F 1/08 326/8 |
| 6,384,651 B1 * | 5/2002 | Horigan | .................... | G06F 1/04 327/175 |
| 8,031,540 B2 * | 10/2011 | Pickles | ................ | G11C 7/1006 365/194 |
| 2004/0114761 A1 | 6/2004 | Atsumi | | |
| 2004/0119619 A1 * | 6/2004 | Lambert | ............. | H03M 7/3008 341/108 |

OTHER PUBLICATIONS

PCT/EP2016/072747, International Search Report—English Translation, dated Nov. 29, 2016, European Patent Office, P.B. 5818 Patentlaan 2 NL—2280 HV Rijswijk.

PCT/EP2016/072747, Written Opinion of the International Searching Authority, dated Nov. 29, 2016, Office european des brevets, D-80298 Munich.

* cited by examiner

| Address\Output n° | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 (=16) | 1 | 1 | 1 | 1 | 1 | 1 | 1 | 1 | 1 | 1 | 1 | 1 | 1 | 1 | 1 | 1 |
| 1 | 1 | 0 | 0 | 0 | 0 | 0 | 0 | 0 | 0 | 0 | 0 | 0 | 0 | 0 | 0 | 0 |
| 2 | 1 | 0 | 0 | 0 | 0 | 0 | 0 | 0 | 1 | 0 | 0 | 0 | 0 | 0 | 0 | 0 |
| 3 | 1 | 0 | 0 | 0 | 0 | 1 | 0 | 0 | 0 | 0 | 0 | 1 | 0 | 0 | 0 | 0 |
| 4 | 1 | 0 | 0 | 0 | 1 | 0 | 0 | 0 | 1 | 0 | 0 | 0 | 1 | 0 | 0 | 0 |
| 5 | 1 | 0 | 0 | 1 | 0 | 0 | 1 | 0 | 0 | 0 | 1 | 0 | 0 | 1 | 0 | 0 |
| 6 | 1 | 0 | 0 | 1 | 0 | 0 | 1 | 0 | 1 | 0 | 0 | 1 | 0 | 0 | 1 | 0 |
| 7 | 1 | 0 | 1 | 0 | 0 | 1 | 0 | 1 | 0 | 1 | 0 | 0 | 1 | 0 | 1 | 0 |
| 8 | 1 | 0 | 1 | 0 | 1 | 0 | 1 | 0 | 1 | 0 | 1 | 0 | 1 | 0 | 1 | 0 |
| 9 | 0 | 1 | 0 | 1 | 1 | 0 | 1 | 0 | 1 | 0 | 1 | 1 | 0 | 1 | 0 | 1 |
| 10 | 0 | 1 | 1 | 0 | 1 | 1 | 0 | 1 | 0 | 1 | 1 | 0 | 1 | 1 | 0 | 1 |
| 11 | 0 | 1 | 1 | 0 | 1 | 1 | 0 | 1 | 1 | 1 | 0 | 1 | 1 | 0 | 1 | 1 |
| 12 | 0 | 1 | 1 | 1 | 0 | 1 | 1 | 1 | 0 | 1 | 1 | 1 | 0 | 1 | 1 | 1 |
| 13 | 0 | 1 | 1 | 1 | 1 | 0 | 1 | 1 | 1 | 1 | 0 | 1 | 1 | 1 | 1 | 1 |
| 14 | 0 | 1 | 1 | 1 | 1 | 1 | 1 | 1 | 0 | 1 | 1 | 1 | 1 | 1 | 1 | 1 |
| 15 | 0 | 1 | 1 | 1 | 1 | 1 | 1 | 1 | 1 | 1 | 1 | 1 | 1 | 1 | 1 | 1 |

RANDOM CLOCK GENERATION

BACKGROUND

1. Field of the Invention

The invention relates to a random clock signal generator. This type of generator is used to clock processors in which synchronisation with an external device is to be avoided.

2. Description of the Related Art

In order to guarantee a certain level of security in communications and electronic transactions, encrypted information exchanges are sometimes used. In order to guarantee the confidentiality of the keys used, it is common to use secure integrated circuits, commonly known as Secure Elements, or SE. SEs are commonly used in chip cards, USB keys or other secure, portable devices, or even integrated in larger devices such as computers or mobile telephones.

These SEs have numerous security elements in order to preserve the confidentiality of the information they contain. To this end, the attacks that may be used to extract confidential information are sometimes identified, and countermeasures are sometimes integrated in the SEs to combat each type of attack. Among the various attacks, it is common to spy on the current consumed by the circuit or its electromagnetic radiation in order to determine which algorithm is currently in operation. In addition, synchronisation on the clock signal allows faults to be introduced to see how the algorithm reacts, and to deduce certain values based on the resulting signature. Among the known countermeasures, one option is to desynchronise the clock signal using clock signal generators that use a pseudo-random or random-type component in order to complicate the analysis of the signals measured.

A pseudo-random generator enables the clock signal to be partially masked. However, a pseudo-random generator is still repetitive, and therefore predictable after a certain period of time.

A major drawback of a purely random clock generator is that it is too unpredictable and therefore sometimes provides a clock that is far too slow for the required use.

Currently, there is no ideal generator to provide a random clock signal.

SUMMARY OF THE INVENTION

The invention proposes a random clock generator that comprises a clock input signal that receives a master clock signal composed of a series of regular and regularly spaced pulses, and a clock signal reduction circuit that receives the master clock signal and an integer N, and which provides an output signal corresponding to a train of N pulses every M clock pulses, where M is an integer greater than 1 and N is an integer greater than 1 and less than or equal to M. In addition, a number generator provides a new number N to the clock signal reduction circuit every P pulses of a master clock signal, with N and/or P produced randomly.

Therefore, following the values M, N, and P, defined by the circuit designer, it is possible to control the "frequency" of the pulses provided by the random clock generator.

According to a preferred embodiment, P may be equal to M, and N may be produced randomly. N may be between a minimum value and a maximum value. The number N may be obtained as an output of an adder or an adder/subtractor that receives an average value of N and a random correction value to be added to or potentially subtracted from this average value. The number generator comprises a non-linear shift register and a random number generator, with this random number generator used to periodically reset the non-linear shift register. The random correction value may then be provided by the non-linear shift register.

BRIEF DESCRIPTION OF THE DRAWINGS

The following description enables us to better understand the implementation of the invention; this description makes reference to the figures provided in the appendix, which include.

DETAILED DESCRIPTION

Figure 1:
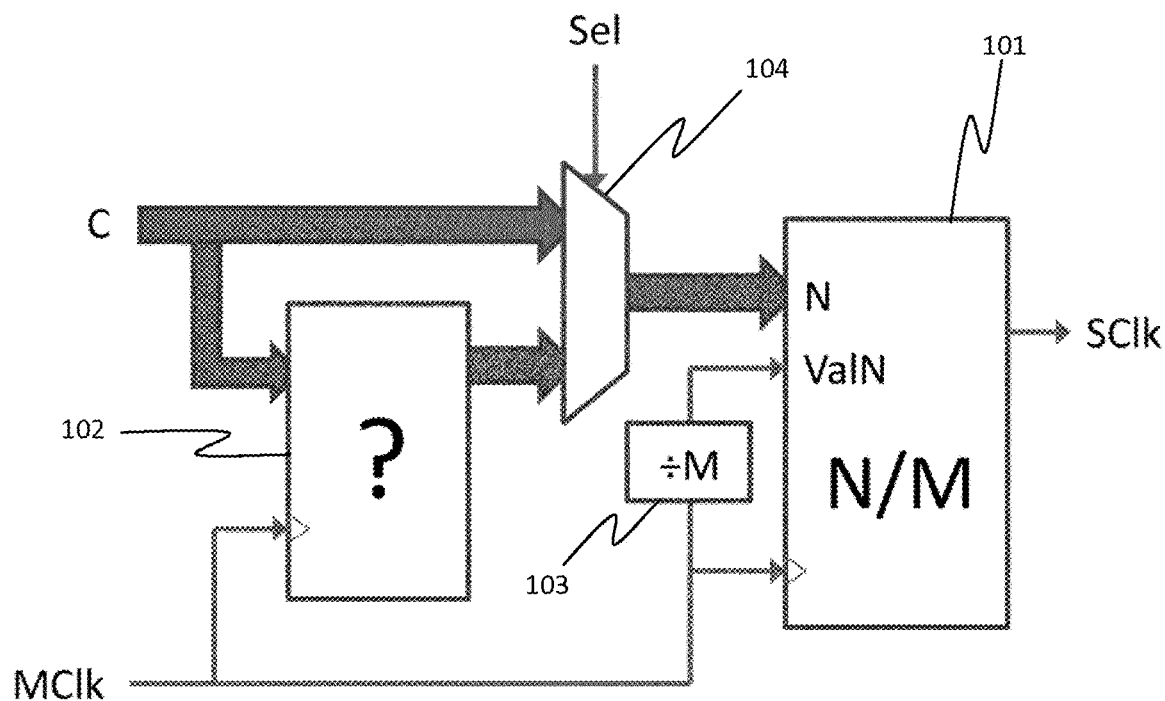
FIG. 1 represents a preferred embodiment of the invention.

The clock generator circuit in FIG. 1 corresponds to a preferred embodiment of the invention. According to the preferred embodiment, this clock generator operates in clock reduction mode and random clock generator mode while guaranteeing an average frequency. This clock generator circuit is preferably integrated in the same chip as the processor of which the clocking is to be masked. In the preferred example, it was chosen to use a master clock signal MClk and convert it into a converted clock signal SClk. This choice was made because it is possible, and even recommended, to simultaneously use the master clock MClk and the converted clock signal SClk on the integrated circuit, in order to further mask the clocking by the converted clock signal SClk. In this way, the production of the master clock signal MClk is not represented, but it may be obtained by any type of oscillator circuit known to those skilled in the art. As an example, a ring oscillator introduced on this same integrated circuit would be appropriate.

The clock generator circuit in FIG. 1 is primarily composed of a clock reduction circuit 101 and a number generator 102. The clock reduction circuit 101 receives the master clock signal MClk and provides the converted clock signal SClk. The principle of the clock reduction circuit 101 is to only let N clock pulses pass through over M clock cycles, where N is between 1 and M, with the number N provided on a clock reduction circuit input 101. The number generator 102 provides a random number N, which serves to configure the clock reduction circuit 101. In the preferred example, the configuration is carried out every M clock cycles using a frequency divider circuit 103, which validates the number N every M clock cycles out of a validation input ValN of the clock reduction circuit 101. The random number N is provided by a number generator 102 to the clock reduction circuit 101 using a multiplexer 104, which enables a random or a non-random mode of operation to be selected using a selection signal Sel. The multiplexer 104 can therefore provide either a random number, or a set number C, which may be provided by another circuit.

As those skilled in the art will have understood, the multiplexer 104 is not essential for the invention and serves solely to provide a means to control the implementation of the invention. It is completely possible to remove the multiplexer 104 by directly connecting the output of the number generator 102 to the input of the clock reduction circuit 101. The circuit will then always function in random mode.

The frequency divider circuit 103 is used to simplify the order to change number N. Indeed, the random aspect is linked to the change of number N by replacing it with another number fairly often, so that it is not possible to easily predict or identify the converted clock signal SCIk by observing the current. The choice to change the number every M cycles is based on making optimal use of the clock reduction circuit 101, the output of which proposes to only keep N pulses out of M.

As an alternative, it is possible to periodically change the value of N every P cycles, with P different from M, but this would not optimise the use of the clock reduction circuit 101. This number change could also be carried out randomly. In this case, a random generator would provide a pulse every P cycles, where P is a random number, and a second generator would provide N either randomly or predictably. The value N would be loaded randomly into the clock reduction circuit 101. Those skilled in the art will understand that it is simpler to use the preferred embodiment as shown in FIG. 1.

Figure 2:
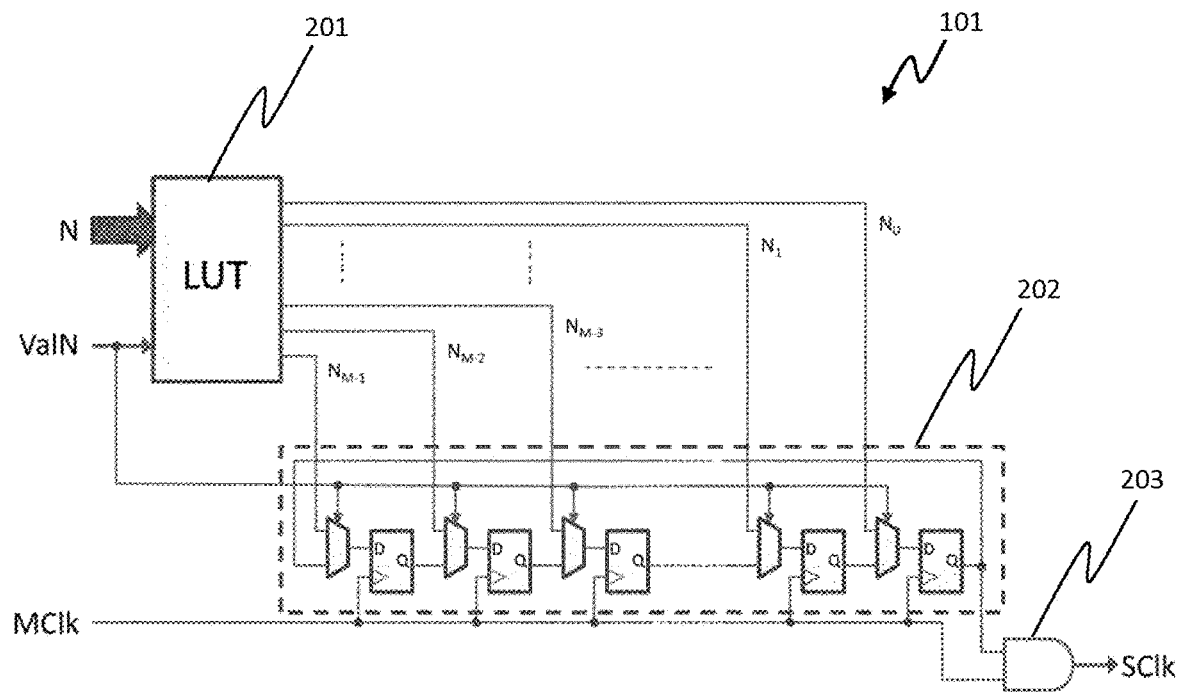
FIG. 2 shows an embodiment of a frequency reducer, as used in the invention.

In order to better explain the operation of the invention, it is necessary to detail the operation of the main elements of the invention. FIG. 2 shows an example embodiment of the clock reduction circuit 101, which is, for example, designed around a lookup table 201 and a shift register 202. The lookup table comprises an input bus to receive the number N, the validation input VaIN enables the value N of the bus to be sampled in order to provide, over M outputs $N_0$ to $N_{M-1}$, the status values memorised at the address corresponding to number N. The M outputs $N_0$ to $N_{M-1}$ of the lookup table are connected to parallel inputs of the shift register 202 and the validation input VaIN selects the operating mode of the shift register. The shift register is synchronised with the master clock signal MCIk. When the validation input VaIN signal is active, then the values provided over the M outputs $N_0$ to $N_{M-1}$ of the lookup table 201 are transferred to the shift register 202. When the validation input VaIN signal is inactive, the register shifts its content one latch to the right, with the output of the last latch of the register 202 fed back to the input of the first latch of the register 202. An AND port 203 receives the output of the last latch of the shift register 202 and the master clock signal MCIk. The output of the AND port 203 provides the converted clock signal SCIk.

Figures 3, 4:
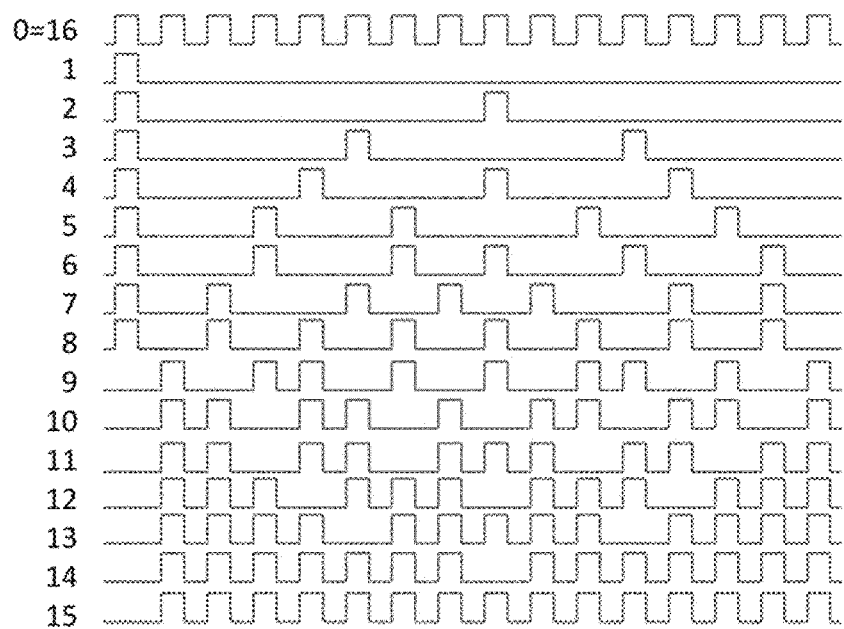
FIG. 3 is an example of a lookup table, as it may be used in the invention.
FIG. 4 shows the pulse trains resulting from the frequency reducing circuit.

FIG. 3 is an example of the content of the lookup table 201 for an M value of 16. The 4-bit encoded value N is between 0 and 15; however, here, the value 0 corresponds to the value 16, from which the 5$^{th}$ most significant bit has been removed. To illustrate the operation of the clock reduction circuit, FIG. 4 shows the converted clock signal for each value of N, with M always equal to 16. Those skilled in the art will understand that controlling the clock signal by removing pulses is the same as changing the frequency of the aforementioned clock signal.

Randomly changing the value of N every M cycles is the same as randomly changing the order of succession of the lines of pulses represented on FIG. 4. Therefore, a consumption current measurement of a circuit partially synchronised by a converted clock SCIk would record drops in consumption at random intervals, which are not possible to predict. As these current drops interfere with the analysis of an algorithm, it is more difficult to analyse the algorithm subjected to an attempted spy operation. In addition, the unpredictable nature of the presence or absence of the next pulse makes any attempt to change the value in a register while in operation very difficult.

With such a circuit, where the value N may be between 1 and M, the number of active pulses of the converted clock signal SCIk may be divided at most by M, in comparison with the number of pulses of the master clock signal MCIk. The processing speed is clearly decreased, but by a controllable maximum value.

Considering that increasing M risks proportionally reducing the processing speed, a preferred mode consists of varying the value of N within a range of values less than the value of M. For example, if N only varies between M/2 and M, at most, the processing speed shall be divided by two in comparison with the maximum processing speed. The increase of the value of M then enables the entropy of the random nature of the clock to be increased, without harming performance. A rather simple embodiment consists of randomly varying only the least significant bits of value N, while keeping the most significant bit at 1.

Figure 5:
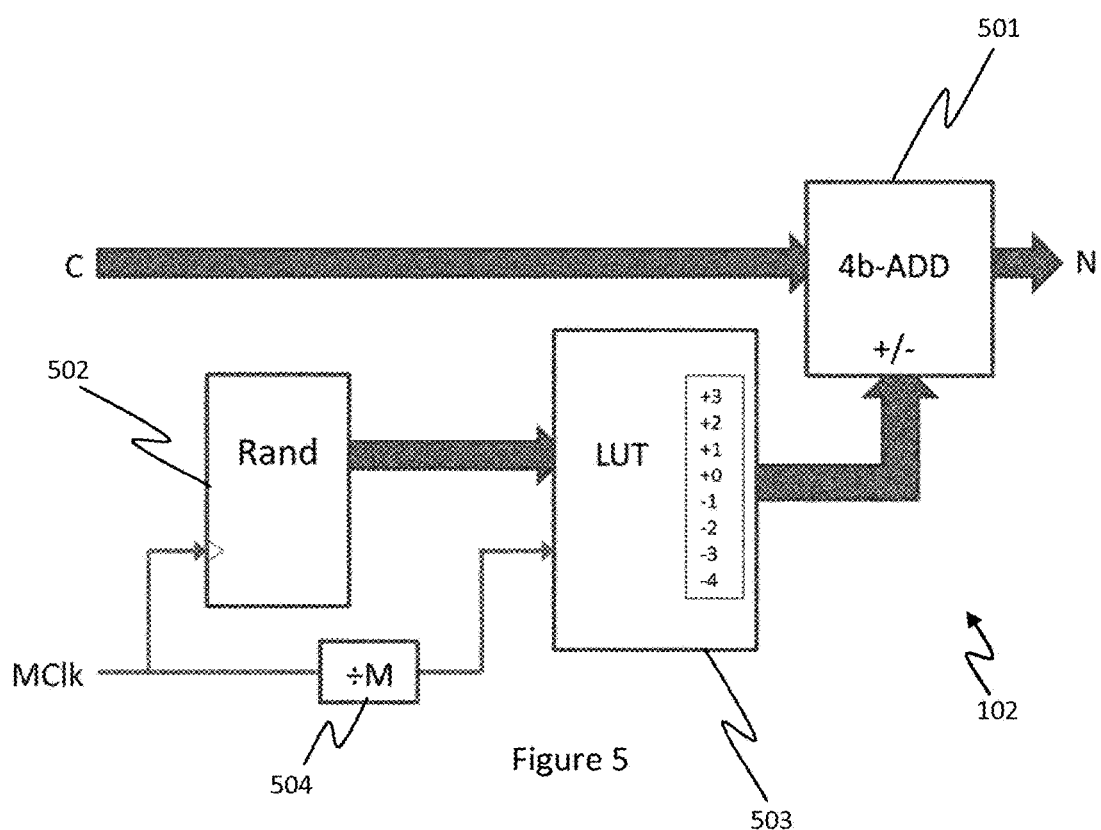
FIG. 5 shows a preferred embodiment of a generator of random numbers within a range of controlled values.

According to a preferred embodiment, the number of pulses may be controlled in order to have the possibility to control the entropy and clocking speed. For this purpose and as a preferred example, the number generator circuit 102 of FIG. 5 is suggested. The number generator 102 comprises an adder 501, a random generator 502, and a shaping circuit 503. Keeping with M=16, the adder 501 is a 4-bit adder that receives a set value C and a random number provided by the shaping circuit 503. The random generator 502 provides a 3-bit random number to the shaping circuit. The output of the adder 501 provides the 4-bit number N. For example, the shaping circuit 503 is a lookup table that will convert a 3-bit encoded random number into a 4-bit signed integer in order to be able to add or subtract the random number to/from set value C. The sampling of the random number at the input of the shaping circuit 503 must be carried out at the same clocking frequency as the sampling of value N at the input of the clock reduction circuit 101. A frequency divider circuit 504. As an example, those skilled in the art will understand that as N is 4-bit encoded and as it is possible to add 3 or subtract 4 to/from the set value C, then it is necessary to have 4<C<M−3.

Such a circuit allows for fairly precise control of value N; it is therefore possible to control the average value of N and the minimum value $N_{min}$ and the maximum value $N_{Max}$ of N. In order to guarantee a minimum clocking speed, it is simply necessary to set the $N_{min}/M$ ratio to the greatest possible value. It is preferable to attempt to keep this $N_{min}/M$ ratio greater than or equal to ½. In addition, the difference of $N_{Max}-N_{min}$ allows the entropy of the random nature to be controlled; the greater the difference $N_{Max}-N_{min}$, the greater the entropy. Those skilled in the art will choose N, $N_{min}$, $N_{Max}$ and M values suited to their requirements.

Figure 6:
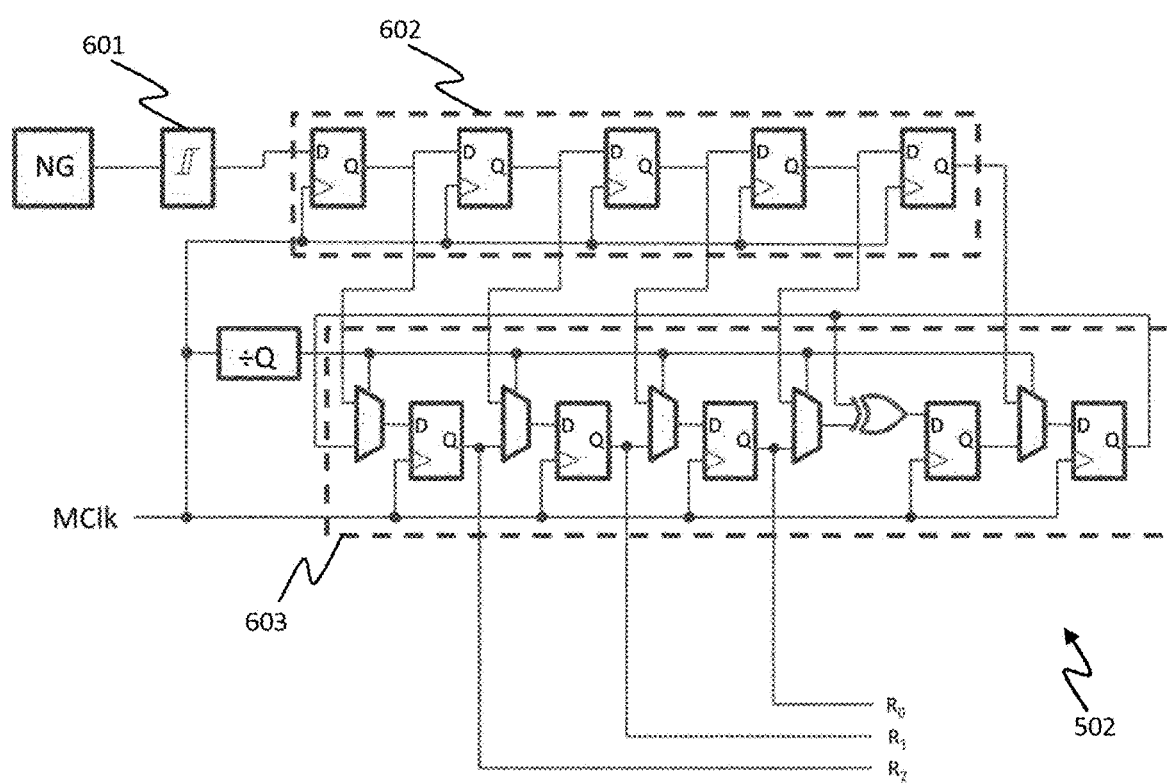
FIG. 6 shows an example of a random number generator.

As an example, a random number generator 502 is depicted in FIG. 6. A noise generator NG provides a difficult-to-predict analogue signal to a trigger circuit 601. The trigger circuit 601 is, for example, a Schmitt trigger, which provides a logic signal with a value of 0 or 1 based on the value of the analogue signal. The logic signal changes status after a random period of time. Therefore, at the time of each front edge of the master clock signal MCIk, the value of the logic signal is either 0 or 1, and this cannot be predicted.

A shift register 602 receives the aforementioned logic signal on a serialisation input so that the register 602 is randomly filled with 0 or 1. The content of the shift register forms a random logical number, which changes for each cycle of the master clock MClk. According to a first embodiment, the random number generator may be limited to what is described above.

However, a drawback of the previous circuit is that sometimes the logic signal provides a succession of 0 or 1 values over a certain period. There would then be a succession of random numbers that would be interchanged. To avoid having two identical random numbers in a row at the output, it is preferable to add a non-linear shift register 603, onto which the content of register 602 is transposed, for example, every Q cycles. Therefore, if the trigger circuit 601 provides a series of bits that is too repetitive, this will be changed by the non-linear shift register 603. In order to recover a random word, the required number of bits are extracted on a parallel output of the register $R_0$, $R_1$ and $R_2$. The word $R_{0-2}$ corresponds to the output word of the random generator 502.

Those skilled in the art may, at their leisure, use the generator described according to one of the aforementioned or suggested variants in a circuit that requires a certain level of security, and for which they wish to mask the effective output of a processor. As an example, for a multiprocessor circuit, several generators may be used to mask the clocking of each processor as much as possible.

The invention claimed is:

1. A random clock generator which comprising:
    a clock signal input that receives a master clock signal composed of a series of regular and regularly spaced pulses,
    a clock signal reduction circuit that receives the master clock signal and an integer N, and which provides an output signal corresponding to a train of N pulses every M clock pulses, where M is an integer greater than 1 and N is an integer greater than 1 and less than or equal to M,
    a number generator, which provides a new number N to the clock signal reduction circuit, every P pulses of a master clock signal, with N and/or P produced randomly.

2. The random clock generator according to claim 1, in which P is equal to M and N is produced randomly.

3. The random clock generator according to claim 1, in which the number generator comprises a non-linear shift register and a random number generator, with this random number generator used to periodically reset the non-linear shift register.

4. The random clock generator according to claim 1, in which N is between a minimum value ($N_{min}$) and a maximum value ($N_{max}$).

5. The random clock generator according to claim 4, in which the number N is obtained as an output of an adder or an adder/subtractor that receives an average value (C) of N and a random correction value ($R_{0-2}$) to be added to or potentially subtracted from this average value.

6. The random clock generator according to claim 3, in which the random correction value is provided by a non-linear shift register.

7. The random clock generator according to claim 4, in which the random correction value is provided by a non-linear shift register.

8. The random clock generator according to claim 5, in which the random correction value is provided by a non-linear shift register.

\* \* \* \* \*